United States Patent
Wuen et al.

(10) Patent No.: US 9,258,498 B2
(45) Date of Patent: Feb. 9, 2016

(54) IMAGE SENSOR

(71) Applicant: NOVATEK Microelectronics Corp., Hsin-Chu (TW)

(72) Inventors: Wen-Shen Wuen, Hsinchu County (TW); Chao-Yu Meng, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 43 days.

(21) Appl. No.: 14/207,659

(22) Filed: Mar. 13, 2014

(65) Prior Publication Data

US 2014/0340552 A1    Nov. 20, 2014

(30) Foreign Application Priority Data

May 17, 2013    (TW) .............................. 102117644 A

(51) Int. Cl.
*H04N 5/357* (2011.01)
*H04N 5/365* (2011.01)
*H04N 5/378* (2011.01)

(52) U.S. Cl.
CPC ........... *H04N 5/3575* (2013.01); *H04N 5/3658* (2013.01); *H04N 5/378* (2013.01)

(58) Field of Classification Search
CPC ... H04N 5/341; H04N 5/3575; H04N 5/3658; H04N 5/378; H04N 5/361; H04N 5/335; H04N 5/365; H04N 5/3745; H04N 5/357; H04N 5/217; H04N 5/359; H04N 5/3595; H04N 3/14; H04N 9/045
USPC ......................................................... 348/302
See application file for complete search history.

(56) References Cited

U.S. PATENT DOCUMENTS

| | | | | |
|---|---|---|---|---|
| 7,868,935 B2 * | 1/2011 | Egawa | .................... | H04N 5/361 348/243 |
| 8,085,449 B2 | 12/2011 | Yoshimura | | |
| 8,310,569 B2 | 11/2012 | Willassen | | |
| 2009/0244338 A1 * | 10/2009 | Kume | .................. | H04N 5/3575 348/294 |
| 2010/0053379 A1 * | 3/2010 | Willassen | ............ | H04N 3/1568 348/241 |
| 2011/0074986 A1 * | 3/2011 | Ogata | ................. | H04N 5/37455 348/243 |
| 2013/0027592 A1 * | 1/2013 | Sugiura | .................. | H04N 5/378 348/243 |
| 2013/0322781 A1 * | 12/2013 | Heinzen | .................... | G06T 5/10 382/275 |
| 2014/0027611 A1 * | 1/2014 | Patel | ...................... | H04N 5/361 250/208.1 |

FOREIGN PATENT DOCUMENTS

| | | |
|---|---|---|
| TW | I379244 | 12/2012 |
| TW | I379411 | 12/2012 |
| TW | I379582 | 12/2012 |
| TW | I379597 | 12/2012 |

* cited by examiner

*Primary Examiner* — Pritham Prabhakher
(74) *Attorney, Agent, or Firm* — Winston Hsu; Scott Margo

(57) ABSTRACT

An image sensor includes a pixel unit and a pixel readout circuit. The pixel unit includes an image pixel array including a plurality of image pixel columns, respectively; a first reference pixel array including a plurality of first reference pixel columns; and a bias circuit, coupled to the image pixel columns for generating a plurality of column sensing signals, coupled to the first reference pixel columns for generating a plurality of first reference signals, and further for generating a first average reference voltage signal according to the plurality of first reference signals. The pixel readout circuit generates a plurality of reset values and a plurality of sampling values according to the column sensing signals and the first average reference voltage signal, wherein the plurality of reference pixel rows is less than the plurality of image pixel rows.

26 Claims, 11 Drawing Sheets

IMAGE SENSOR

BACKGROUND OF THE INVENTION

1. Field of the Invention

The present disclosure relates to an image sensor, and more particularly, to an image sensor in which one or more reference pixel rows are shared to eliminate row noises from different image pixel rows and to reduce reference pixel area, thereby preventing from the drop of frame rate when eliminating the row noises by a digital approach or avoiding extra noises and reducing circuit area when eliminating the row noises by an analog approach.

2. Description of the Prior Art

In general, in an image sensor, a pixel readout circuit such as a correlation double sampling (CDS) is utilized to read image pixel rows row by row so as to generate reset values and sampling values. Consequently, when different image pixel rows are read, even though the patterns of the different image pixel rows are actually identical, pixel readout circuit may still read different reset values and sampling values owing to random noises, more specifically, because external electrical potential like system voltages, grounded electrical potential and bias reference voltages are disturbed by the random noises. In this case, the conventional image sensor is usually equipped with a reference pixel array in order to eliminate the row noises caused by the random noises.

Please refer to FIG. 1, which is a schematic diagram illustrating a conventional image sensor 10. As shown in FIG. 1, the image sensor 10 comprises a pixel unit 100, a pixel readout circuit 102, a control circuit 104, a row control circuit 106, a column decoder 108, a differential amplifier 110, an analog-to-digital converter 112 (ADC) and an image signal processor 114. The pixel unit 100 further comprises an image pixel array 116 and an optical-black-area pixel array 118 and optionally comprises a reference pixel array 120. The reference pixel array 120 is disposed after the last pixel (or before the first pixel) of each row of the image pixel array 116.

In short, after photodiodes of each of the pixels in the image pixel array 116 are exposed to light during an image sensing process, charges are induced by the photodiodes and stored in the corresponding sensing capacitors. Subsequently, the control circuit 104 controls the row control circuit 106, the column decoder 108 and the pixel readout circuit 102, such that the pixel readout circuit 102 samples the image pixel array 116 row by row and generates the reset values and the sampling values of each pixel. Then, the difference between the reset values and the sampling values is amplified, converted from analog to digital form and processed by the differential amplifier 110, the analog-to-digital converter 112 and the image signal processor 114. During the image sensing process, the optical-black-area pixel array 118 and the reference pixel array 120 are shielded against light in order to respectively provide dark current and the information of random noises when the pixel readout circuit 102 performs sampling; therefore, the pixel readout circuit 102 or the image signal processor 114 can respectively suppress dark current and random noises by analog or digital approaches.

To be more specific, please refer to FIGS. 2A to 2C. FIG. 2A is a schematic diagram illustrating an image sensor 20 which embodies the image sensor 10 shown in FIG. 1 in the prior art. FIG. 2B is a schematic diagram illustrating a pixel 202 shown in FIG. 2A. FIG. 2C is a timing schematic diagram illustrating the signals shown in FIGS. 2A and 2B. In short, as shown in FIGS. 2A to 2C, the image pixel array 116 comprises the image pixel rows $R_1$-$R_n$ and the image pixel columns $C_1$-$C_m$. The pixel 202 may be any pixel in the image pixel array 116. For example, the pixel 202 can be located at a point of any intersection of the image pixel rows $R_1$-$R_n$ and the image pixel columns $C_1$-$C_m$. The pixel readout circuit 200 comprises the sample-and-hold circuits $SHC_1$-$SHC_m$, which respectively correspond to the image pixel columns $C_1$-$C_m$.

In this structure, during the image sensing process, a photodiode 204 exposed to light generates charges and the charges are stored in a sensing capacitor 206 to serve as a sensing signal. When a bias reference voltage BIAS is high and after a row selecting signal chooses the image pixel row with the pixel 202 and hence a row switch RS is switched on, a pixel reset switch RST and a reset switch SHR are turned on in sequence. Subsequently, according to a system voltage VDD, which is not the sensing signal stored by the sensing capacitor 206, a transistor 208 is conducted so that charges are stored in a reset capacitor CR to serve as a reset value. Then, a pixel transmission switch TX and a sampling switch SHS are turned on in sequence, such that the transistor 208 is conducted according to the sensing signal and the charges are stored in a sampling capacitor CS to serve as a sampling value. When the reset values and the sampling values are read, an average reference voltage signal switch set ARVS may respectively control a terminal of the reset capacitor CR and the sampling capacitor CS to respectively connect a reference voltage $V_{REF}$ with the switches SW2 and SW1, thereby eliminating non-ideal factors such as dark current. Finally, a switch CB is conducted and a column selection circuit CSC controls a switch in the corresponding column to be turned on, such that the difference between the reset values and the sampling values stored in the corresponding reset capacitor CR and the corresponding sampling capacitor CS are transmitted to the differential amplifier 110 for the following processes.

However, because the image sensor 20 does not comprise the reference pixel array 120 for the pixel readout circuit 200 or the image signal processor 114 to compensate for random noises, and because merely a capacitor CB is added at an input terminal of the bias reference voltage BIAS within a bias circuit 210 of the pixel readout circuit 200 to prevent the random noises of the bias circuit 210 from entering the pixel readout circuit 200, row noises may still remain if any other external electrical potential brings random noises into the image.

Besides, please refer to FIG. 3, which is a schematic diagram illustrating an image sensor 30 which embodies the image sensor 10 in the prior art. Since the image sensor 30 is partially similar to the aforementioned image sensor 20, the same numerals and symbols denote components and signals of similar functions in FIG. 3 and the following description. The main difference between the image sensor 30 and the image sensor 20 is that the image sensor 30 further comprises the reference pixel array 120, which comprises the reference pixel rows $RR_1$-$RR_n$ and the reference pixel columns $C_{m+1}$-$C_{m+k}$. A pixel readout circuit 300 further comprises the sample-and-hold circuits $SHC_{m+1}$-$SHC_{m+k}$ respectively corresponding to the reference pixel columns $C_{m+1}$-$C_{m+k}$ in the reference pixel array 120. The reference pixel columns $C_{m+1}$-$C_{m+k}$ are disposed after the last pixels of the image pixel columns $C_1$-$C_m$—namely, the reference pixel rows $RR_1$-$RR_n$ are disposed after the image pixel rows $R_1$-$R_n$. The pixel 202 may also be any reference pixel of the reference pixel array 120, only that the reference pixel is shielded against light and does not sense light during the image sensing process. The sample-and-hold circuits $SHC_{m+1}$-$SHC_{m+k}$ and the sample-and-hold circuits $SHC_1$-$SHC_m$ have identical structure.

In this structure, during the image sensing process, the image pixel array 116 is exposed to light and the optical-black-area pixel array 118 and the reference pixel array 120 are shielded against light or set as the non-light-sensing pixel. The pixel readout circuit 300 then utilizes the sample-and-hold circuits $SHC_1$-$SHC_m$ and $SHC_{m+1}$-$SHC_{m+k}$ to respectively read the image pixel rows $R_1$-$R_n$ and the reference pixel rows $RR_1$-$RR_n$ row by row, such that the corresponding reset values, the corresponding sampling values, the corresponding reference reset values and the corresponding reference sampling values are obtained by means of the method similar to that of the pixel readout circuit 200 mentioned above. Then, the differences between the reset values and the sampling values and the differences between the reference reset values and the reference sampling values are amplified, converted from analog to digital form and processed by the differential amplifier 110, the analog-to-digital converter 112 and the image signal processor 114. In this case, when the image signal processor 114 performs image signal process, the average of the differences of the reference reset values and the reference sampling values of the pixels corresponding to the specific reference pixel row in the corresponding reference pixel rows $RR_1$-$RR_n$ is subtracted from the differences of the reset values and the sampling values of the pixels of the corresponding specific image pixel row in the image pixel rows $R_1$-$R_n$ by the digital approach so as to eliminate the disturbance of external electrical potential owing to random noises.

Moreover, in the U.S. Pat. No. 8,310,569, each of the sample-and-hold circuits further comprises an amplifier, and the corresponding average capacitor replaces the corresponding sample-and-hold circuit of the reference pixel column. The average capacitors may store charges by means of the method similar to that of reading the reset values and the sampling values illustrated above and generate an average reference voltage by averaging the charges to each amplifier so as to directly provide the average reference voltage to another terminal of the reset capacitor and the sampling capacitor by the analog approach, thereby eliminating the disturbance of external electrical potential owing to random noises.

In addition, in the U.S. Pat. No. 8,310,569, the reference pixel array merely further comprises reference pixels, and each of the reference pixels respectively corresponds to one of the image pixel columns. Subsequently, the pixel readout circuit may directly generate each of the corresponding reference voltages by means of the method similar to that of reading the reset values and the sampling values illustrated above so as to directly provide the reference voltages respectively to another terminal of the reset capacitor and the sampling capacitor by the analog approach, thereby eliminating the disturbance of external electrical potential owing to random noises.

SUMMARY OF THE INVENTION

It is one of the main objectives of the disclosure to provide an image sensor in which one or more reference pixel rows are shared to eliminate row noises from different image pixel rows and to reduce reference pixel area, thereby preventing from the drop of frame rate when eliminating the row noises by a digital approach or avoiding extra noises and reducing circuit area when eliminating the row noises by an analog approach.

The disclosure provides an image sensor comprising a pixel unit and a pixel readout circuit. The pixel unit comprises an image pixel array, comprising a plurality of image pixels, arranged in a plurality of image pixel rows and a plurality of image pixel columns; a first reference pixel array, comprising a plurality of first reference pixels, arranged in one or more first reference pixel rows and a plurality of first reference pixel columns; and a bias circuit, coupled to the image pixel array, the first reference pixel array, and the pixel readout circuit, wherein the bias circuit generates a plurality of column sensing signals in a plurality of nodes coupled to the plurality of image pixel columns according to a bias voltage, generates a plurality of first reference signals in the plurality of nodes coupled to the plurality of first reference pixel columns according to the bias voltage, and converts the plurality of first reference signals to a first average reference voltage signal. The pixel readout circuit is coupled to the bias circuit of the pixel unit for generating a plurality of reset values and a plurality of sampling values according to the plurality of column sensing signals and the first average reference voltage signal. The plurality of image pixel rows comprises a plurality of first image pixel rows, a total number of the plurality of first image pixel rows is M1, and a total number of the first reference pixel rows is N1, where M1>N1.

The disclosure further provides an image sensor comprising a pixel unit and a pixel readout circuit. The pixel unit comprises an image pixel array, comprising a plurality of image pixels, arranged in a plurality of image pixel rows and a plurality of image pixel columns; a first reference pixel array, comprising a plurality of first reference pixels, arranged in one or more first reference pixel rows and a plurality of first reference pixel columns; and a bias circuit, coupled to the image pixel array, the first reference pixel array, and the pixel readout circuit, wherein the bias circuit generates a plurality of column sensing signals in a plurality of nodes coupled to a plurality of image pixel columns according to a bias voltage, generates a plurality of first reference signals in a plurality of nodes coupled to a plurality of first reference pixel columns, and converts the plurality of first reference signals to a first average reference voltage signal. The pixel readout circuit is coupled to the bias circuit of the pixel unit for generating a plurality of reset values and a plurality of sampling values according to the plurality of column sensing signals and the first average reference voltage signal. When the pixel readout circuit reads an image pixel row among the plurality of first image pixel rows, a first image pixel row among the one or more of first reference pixel rows is turned on. When the pixel readout circuit reads another image pixel row among the plurality of first image pixel rows, a second image pixel row among the one or more of first reference pixel rows is turned on, wherein the first reference pixel row and the second reference pixel row comprise one or more of identical reference pixel rows.

These and other objectives of the present invention will no doubt become obvious to those of ordinary skill in the art after reading the following detailed description of the preferred embodiment that is illustrated in the various figures and drawings.

DETAILED DESCRIPTION

In the following description and the claims as well, the term "couple" is intended to mean either an indirect or direct electrical connection. Accordingly, if one device is coupled to another device, that connection may be through a direct electrical connection, or through an indirect electrical connection via other devices and connections.

Figure 4:
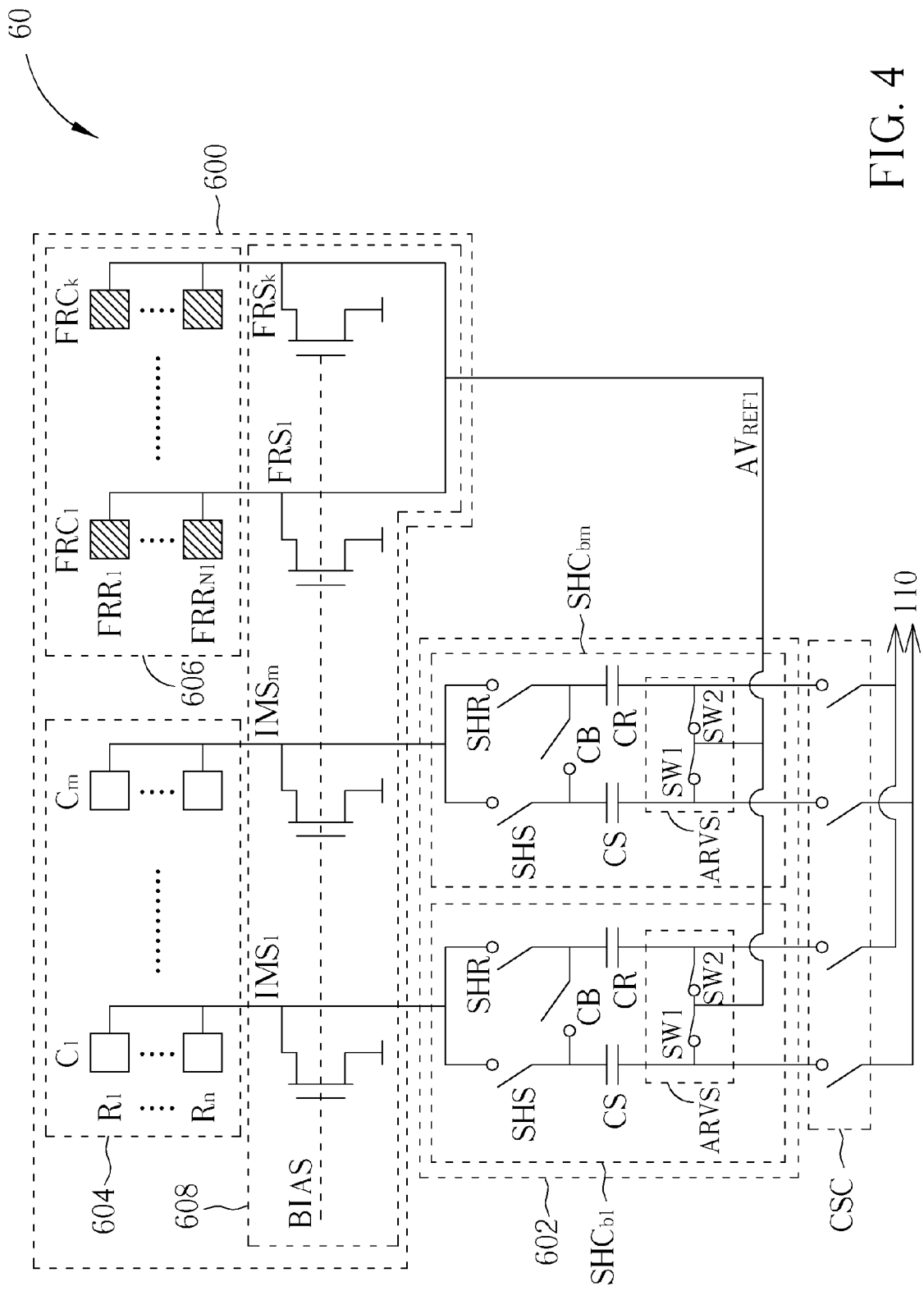
FIG. 4 is a schematic diagram partially illustrating a circuit of an image sensor according to an embodiment of the present invention.

Please refer to FIG. 4, which is a schematic diagram partially illustrating a circuit of an image sensor 60 according to an embodiment. As shown in FIG. 4, the image sensor 60 comprises a pixel unit 600 and a pixel readout circuit 602. The pixel unit 600 comprises an image pixel array 604, a reference pixel array 606 and a bias circuit 608. Since the image sensor 60 is basically similar to the aforementioned image sensors 10-50, the same numerals and symbols denote components and signals of similar functions in FIG. 4 and the following description. In this schematic diagram, although the pixel unit 600 and the pixel readout circuit 602 are presented closely, and the image pixel array 604, the reference pixel array 606 and the bias circuit 608 are also presented closely, these components in the physical structure may be integrated into one module or disposed separately according to different design considerations and system requirements for practical concerns.

Figure 1:
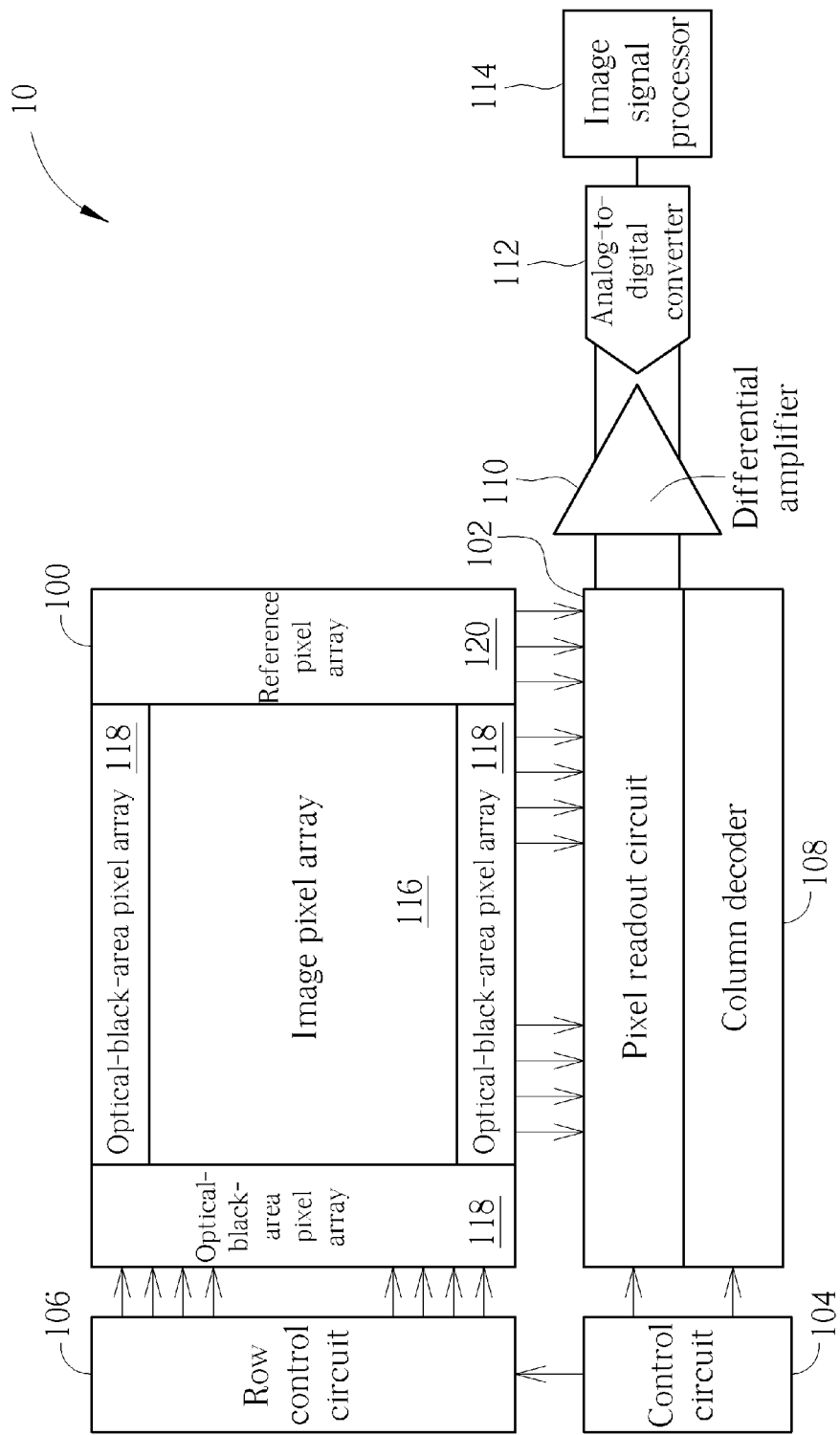
FIG. 1 is a schematic diagram illustrating a conventional image sensor.

In short, the image pixel array 604 includes a plurality of image pixels arranged in image pixel rows $R_1$-$R_n$ and image pixel columns $C_1$-$C_m$, where n and m are positive integers. The reference pixel array 606 includes a plurality of reference pixels arranged in reference pixel rows $FRR_0$-$FRR_{N1}$ and reference pixel columns $FRC_1$-$FRC_k$, where N1 and k are positive integers. Besides, the reference pixels comprised by the reference pixel array 606 may be placed in an optical black area, e.g. where the optical-black-area pixel array 118 and the reference pixel array 120 are located as shown in FIG. 1, or disposed as non-light-sensing pixels.

Figure 2A:
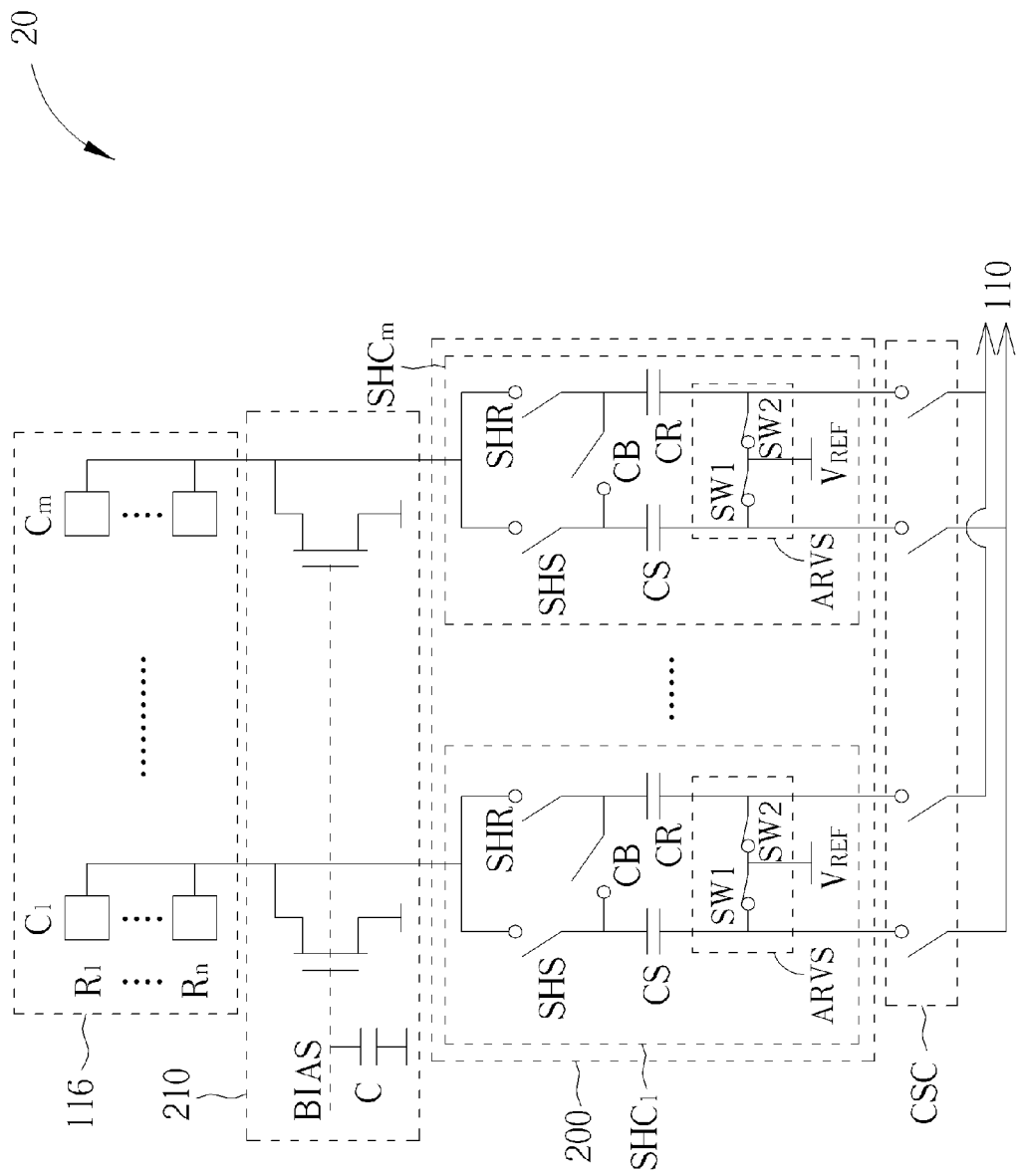
FIG. 2A is a schematic diagram illustrating an image sensor which embodies the image sensor shown in FIG. 1 in the prior art.
Figure 2B:
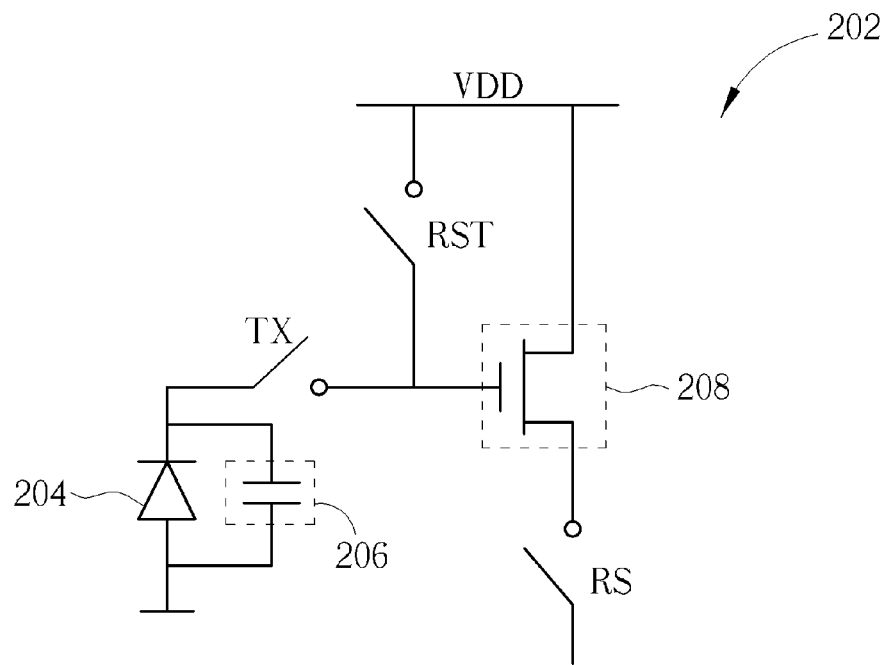
FIG. 2B is a schematic diagram illustrating a pixel shown in FIG. 2A.

The bias circuit 608 is coupled to the image pixel array 604, the reference pixel array 606 and the pixel readout circuit 602. According to a bias voltage BIAS, the bias circuit 608 generates a plurality of column sensing signals $IMS_1$-$IMS_m$ (i.e., the signals outputted from the switch RS and induced by the stored charges, which are stored by the sensing capacitor 206 of each of the image pixels as shown in FIG. 2B when image sensing is performed and thus the image pixel array 604 is illuminated) in a plurality of nodes coupled to the plurality of the image pixel columns $C_1$-$C_m$ and generates reference signals $FRS_1$-$FRS_k$ (i.e., the signals output from the switch RS and induced by the stored charges, which are stored by the sensing capacitor 206 of each of the image pixels shown in FIG. 2B when image sensing is performed but the image pixel array 606 is not illuminated) in a plurality of nodes coupled to a plurality of first reference pixel columns (i.e., the reference pixel columns in the first columns of the reference pixel columns $FRC_1$-$FRC_k$). The bias circuit 608 further converts the reference signals $FRS_1$-$FRS_k$ into an average reference voltage signal $AV_{REF}$—namely, the average reference voltage signal $AV_{REF1}$ is generated by averaging the reference signals $FRS_1$-$FRS_k$. Moreover, the pixel readout circuit 602 is coupled to the bias circuit 608 of the pixel unit 600 in order to generate a plurality of reset values and a plurality of sampling values according to the column sensing signals $IMS_1$-$IMS_m$ and the average reference voltage signal $AV_{REF1}$.

In this embodiment, a total number of the image pixel rows is greater than a total number of the reference pixel rows. Specifically speaking, if the image pixel rows $R_1$-$R_n$ is composed of the image pixel rows $FR_1$-$FR_{M1}$, meaning that the total number of the image pixel rows $FR_1$-$FR_{M1}$ is M1 and the total number of the reference pixel rows $FRR_1$-$FRR_{N1}$ is N1, then M1>N1. Since the total number of the image pixel rows is determined to be greater than the total number of the reference pixel rows, when at least two of the image pixel rows are respectively read, one or more of the identical reference pixel rows are designed to be referenced and hence turned on. That is to say, the total number of the image pixel rows is not necessary to be equal to the total number of the reference pixel rows; moreover, each image pixel row is not required to have an associated reference pixel row different from other image pixel rows to be referenced and consequently turned on when the image pixel row is read. In contrast, in this embodiment, the total number of the image pixel rows is greater than the total number of the reference pixel rows, and at least two of the image pixel rows are designed to share or corresponds to one or more of the identical reference pixel rows.

Take the image pixel rows, which all share identical and all of the reference pixel rows, as an example. When the pixel readout circuit 602 reads any of the image pixel rows $FR_1$~$FR_{M1}$ to generate the reset values and the sampling values, each row of the reference pixel rows $FRR_1$-$FRR_{N1}$ is turned on, such that, meanwhile, the pixel readout circuit 602 can read the average reference voltage signal $AV_{REF1}$, which is generated by the reference pixel rows $FRR_1$-$FRR_{N1}$ and transmitted to another terminal of the reset capacitor CR and the sampling capacitor CS, thereby eliminating effects from external electrical potential with random noises by an analog approach.

Figure 3:
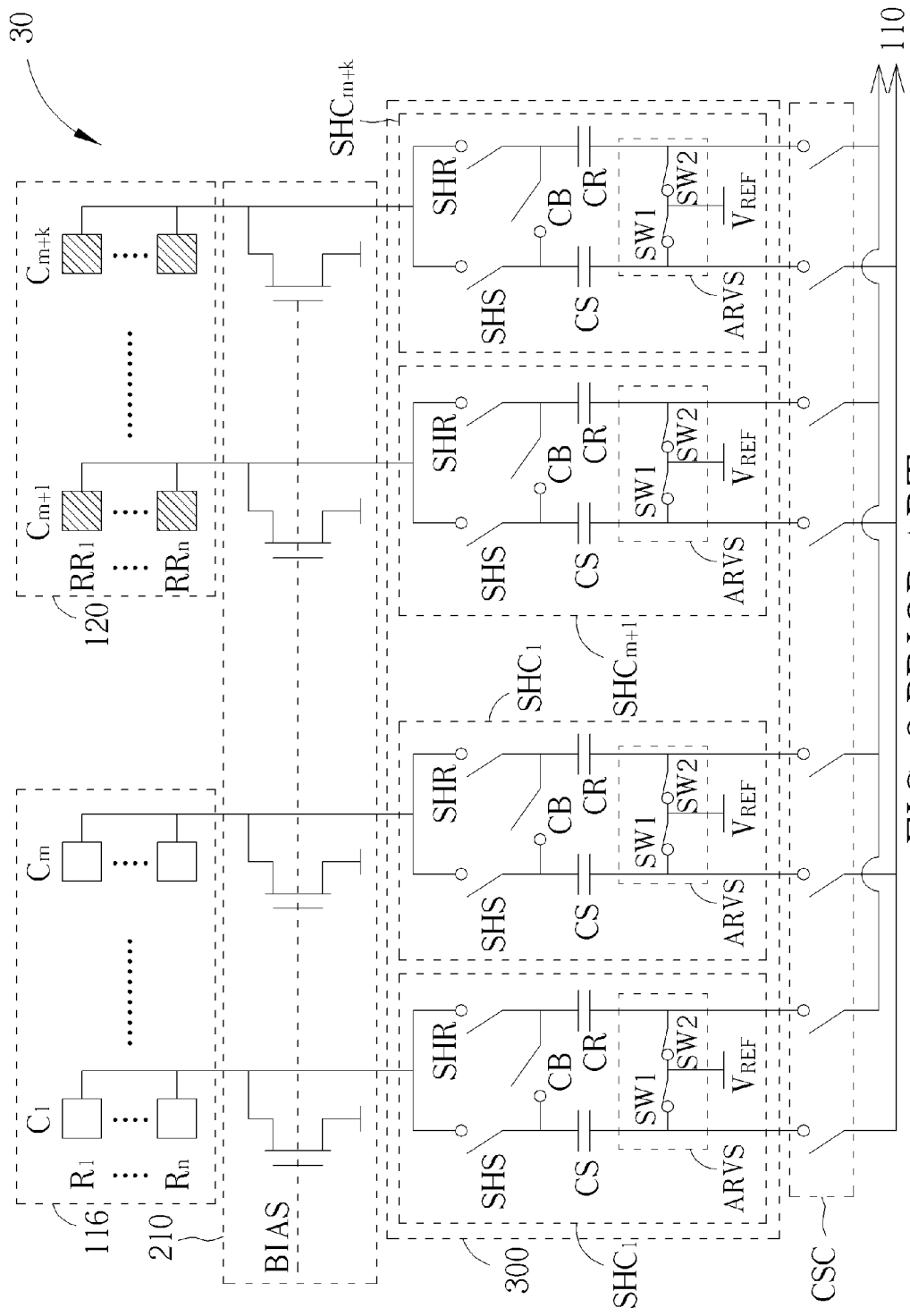
FIG. 3 is a schematic diagram illustrating an image sensor which embodies the image sensor in the prior art.

Since the average reference voltage signal $AV_{REF1}$ is generated with the identical reference pixel rows $FRR_1$-$FRR_{N1}$ when each of the image pixel rows $FR_1$-$FR_{M1}$ are read by the pixel readout circuit 602, the end of each of the image pixel rows $R_1$-$R_{M1}$ is not required to be disposed with a great deal of reference pixels as shown in FIG. 3, and merely a few of the reference pixel rows $FRR_1$-$FRR_{N1}$ are disposed in a specific region for sharing, thereby significantly reducing the reference pixel area. As a result, the identical reference pixel rows $FRR_1$-$FRR_{N1}$ are shared in the image sensor 60 to eliminate different noises from different image pixel rows and to reduce the reference pixel area. In a specific embodiment, the total number N1 of the reference pixel rows $FRR_1$-$FRR_{N1}$ may equal 1, such that the reference pixel row $FRR_1$ can be shared in the image sensor 60 to eliminate different noises from different image pixel rows.

It is worth noting that the above embodiment mainly focuses on sharing one or more of the reference pixel rows to eliminate different noises from different image pixel rows and to reduce the reference pixel area. However, the present invention is not limited thereto, and those skilled in the art might make modifications or alterations accordingly. For example, in the above-mentioned embodiment, when the pixel readout circuit 602 reads each of the image pixel rows $FR_1$-$FR_{M1}$, all of the reference pixel rows $FRR_1$-$FRR_{N1}$ are turned on. On the other hand, in other embodiments, when the pixel readout circuit 602 reads the first image pixel rows of the image pixel rows $FR_1$-$FR_{M1}$, only a first set of the reference pixel rows $FRR_1$-$FRR_{N1}$ is turned on, and when the pixel readout circuit 602 reads the second image pixel rows of the image pixel rows $FR_1$-$FR_{M1}$, only a second set of the reference pixel rows $FRR_1$-$FRR_{N1}$ is turned on. The first set and the second set of the reference pixel rows may include one or more of the identical reference pixel rows. In other words, when noises from the first image pixel rows and the second image pixel rows are eliminated, only a portion of the reference pixel rows $FRR_1$-$FRR_{N1}$ (i.e., the identical reference pixel row comprised by both the first set and the second set of the reference pixel rows) is shared.

In addition, it is worth noting that in the aforementioned embodiments, since the total number of the image pixel rows is arranged to be greater than the total number of the reference pixel rows, when at least two of the image pixel rows are respectively read, one or more of the identical reference pixel rows are designed to be referenced and hence turned on. However, in other embodiments, even if the total number of the image pixel row is arranged to be equal to or greater than the total number of the reference pixel row—namely, the relation between the total number of the image pixel rows and the total number of the reference pixel rows may not be limited—at least two of the image pixel rows may still be designed to share or correspond to one or more of the identical reference pixel rows, which is still within the scope of the present invention.

Figure 5:
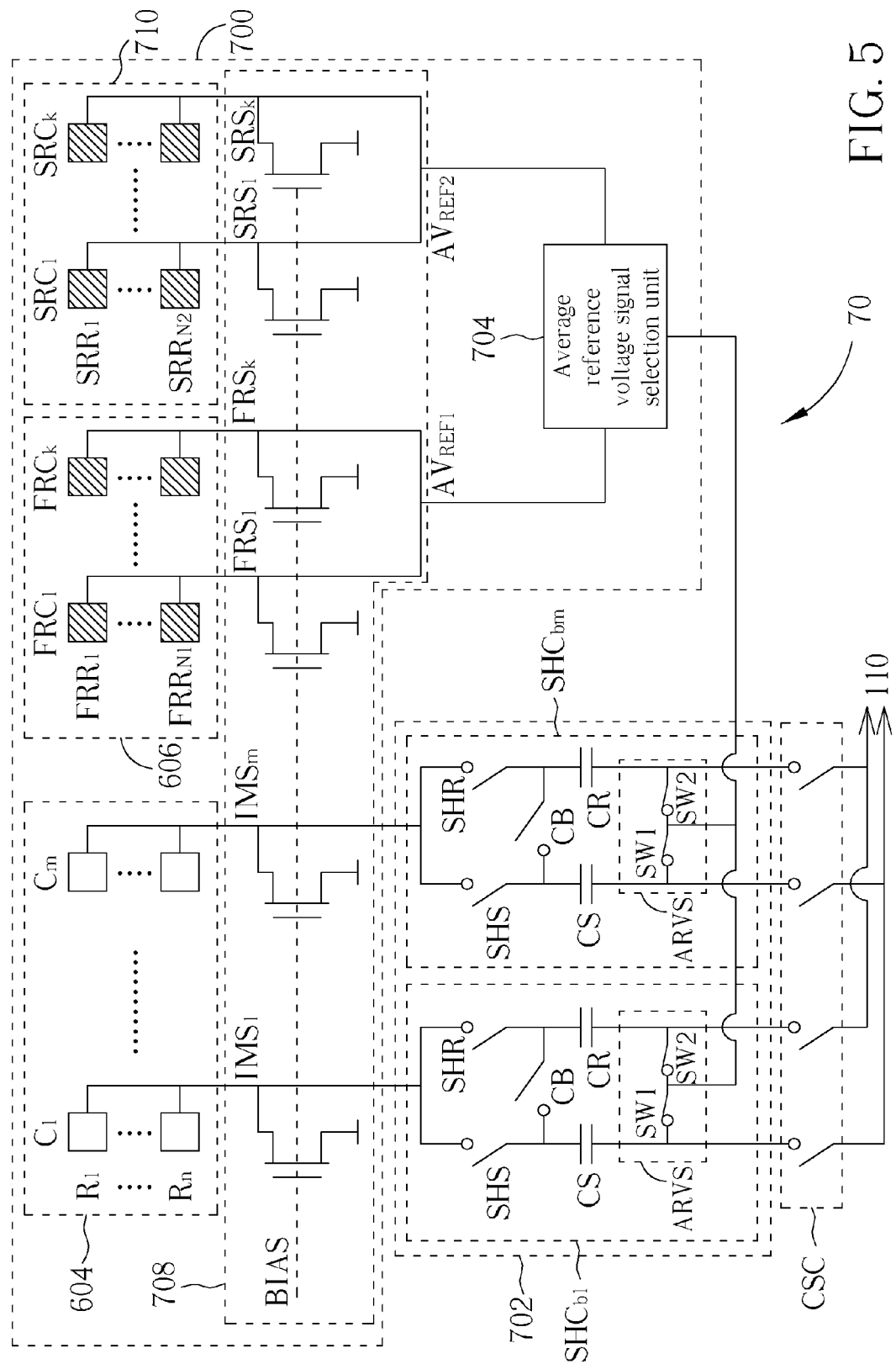
FIG. 5 is a schematic diagram partially illustrating a circuit of another image sensor according to an embodiment of the present invention.

In addition, please refer to FIG. 5; FIG. 5 is a schematic diagram partially illustrating a circuit of another image sensor 70 according to an embodiment. Since the image sensor 70 is partially similar to the aforementioned image sensor 60, the same numerals and symbols denote components and signals of similar functions in FIG. 5 and the following description, and similar parts are not detailed redundantly. Unlike the image sensor 60, in a pixel unit 700 of the image sensor 70, the image pixel array 604 further includes a plurality of image pixel rows $SR_1$-$SR_{M2}$. Moreover, the pixel unit 700 further comprises a reference pixel array 710 and an average reference voltage signal selection unit 704, and the reference pixel array 710 includes a plurality of reference pixels arranged in reference pixel rows $SRR_1$-$SRR_{N2}$ and reference pixel columns $SRC_1$-$SRC_k$. A bias circuit 708 is not only operated in the similar operation principle of the bias circuit 608 but also coupled to the reference pixel array 710. Besides, the bias circuit 708 generates reference signals $SRS_1$-$SRS_k$ in a plurality of nodes coupled to the reference pixel columns $SRC_1$-$SRC_k$ according to the bias voltage BIAS. The bias circuit 708 further converts the reference signals $SRS_1$-$SRS_k$ into an average reference voltage signal $AV_{REF2}$. A pixel readout circuit 702 is also coupled to the reference pixel array 710 so as to generate a plurality of reset values and a plurality of sampling values according to one of the column sensing signals $IMS_1$-$IMS_m$ and the average reference voltage signal $AV_{REF1}$ and the average reference voltage signal $AV_{REF2}$. The average reference voltage signal selection unit 704 is coupled to the reference pixel array 606 and the reference pixel array 710.

Similar to the embodiment shown in FIG. 4, a total number M1 of a plurality of image pixel rows $FR_1$-$FR_{M1}$ in the image pixel array 604 is greater than a total number N1 of the reference pixel rows in the reference pixel array 606. Also, a total number M2 of a plurality of image pixel rows $SR_1$-$SR_{M2}$ in the image pixel array 604 is greater than a total number N2 of the reference pixel rows in the reference pixel array 710. More specifically, the image pixel rows $R_1$-$R_n$ are composed of the image pixel rows $FR_1$-$FR_{M1}$ and the image pixel rows $SR_1$-$SR_{M2}$. If the total number of the image pixel rows $FR_1$-$FR_{M1}$ is M1, if the total number of the image pixel rows $SR_1$-$SR_{M2}$ is M2, if the total number of the reference pixel rows $FRR_1$-$FRR_{N1}$ in the reference pixel array 606 is N1, and if the total number of the reference pixel rows $SRR_1$-$SRR_{N2}$ in the reference pixel array 710 is N2, then M1>N1 and M2>N2. Please note that in this embodiment, M1 is greater than N1 and M2 is greater than N2; nevertheless, in other embodiments, chances are that M1 is greater than N1 and alternatively M2 is greater than N2, which are still within the scope of the present invention.

In this structure, when the pixel readout circuit 602 reads any of the image pixel rows $FR_1$-$FR_{M1}$, the average reference voltage signal selection unit 704 selects the reference voltage signal $AV_{REF1}$ to be transmitted into the pixel readout circuit 602. When the pixel readout circuit 602 reads one of the image pixel rows $SR_1$-$SR_{M2}$, the average reference voltage signal selection unit 704 selects the average reference voltage signal $AV_{REF2}$ to be transmitted into the pixel readout circuit 602. As a result, in the image sensor 70, the image pixel rows $FR_1$-$FR_{M1}$ and the image pixel rows $SR_1$-$SR_{M2}$ may respectively share the reference pixel array 606 and the reference pixel array 710 so as to eliminate row noises. Preferably, the total number N1 of the reference pixel rows $FRR_1$-$FRR_{N1}$ may be designed to 1, that is, N1=1. Alternatively, the total number N2 of the reference pixel rows $SRR_1$-$SRR_{N2}$ may be designed to 1. Accordingly, the reference pixel area is reduced.

It is worth noting that, in some embodiments, the reference pixel rows $FRR_1$-$FRR_{N1}$ of the reference pixel array 606 correspond to the reference pixel rows $SRR_1$-$SRR_{N2}$ of the reference pixel array 710 in certain manner, and the reference pixel rows corresponding to each other share identical row turning-on signals. For example, the reference pixel rows $FRR_1$-$FRR_{N1}$ respectively correspond to the reference pixel rows $SRR_1$-$SRR_{N2}$; therefore, the reference pixel rows $FRR_1$ and $SRR_1$ share identical row turning-on signals, by the same token the reference pixel rows $FRR_2$ and $SRR_2$ share identical row turning-on signals, so on and so forth. It is because that the configuration of the average reference voltage signal selection unit 704 may properly pick up the desired average reference voltage signal. For example, if the pixel readout circuit 602 reads any of the image pixel rows $FR_1$-$FR_{M1}$ instead of any of the image pixel rows $SR_1$-$SR_{M2}$, although the corresponding reference pixel rows in both the reference pixel array 606 and 710 are switched on owing to sharing the same row turning-on signals, the average reference voltage signal selection unit 704 can still be employed to properly select the average reference voltage signal $AV_{REF1}$.

In addition, in other embodiments, the reference pixel rows $FRR_1$-$FRR_{N1}$ of the reference pixel array 606 may not correspond to the reference pixel rows $SRR_1$-$SRR_{N2}$ of the reference pixel array 710 in certain manner. Alternatively, the reference pixel rows corresponding to each other may not share identical row turning-on signals but have different row turning-on signals independently switching on or off instead.

Furthermore, when the pixel readout circuit 602 reads any of the image pixel rows $FR_1$-$FR_{M1}$ and the image pixel rows $SR_1$-$SR_{M2}$, the corresponding reference pixel row in either the reference pixel array 606 or the reference pixel array 710 is turned on but all the other reference pixel rows are turned off, and the average reference voltage signal selection unit 704 selects either the average reference voltage signal $AV_{REF1}$ or $AV_{REF2}$ corresponding to either the reference pixel array 606 or the reference pixel array 710. The reference pixel rows in the other one of the reference pixel array 606 and the reference pixel array 710 may all be turned off or partially turned on. It is because that the average reference voltage signal selection unit 704 does not pick up another corresponding one of the average reference voltage signals.

In summary, as long as when the pixel readout circuit 602 reads any of the image pixel rows $FR_1$-$FR_{M1}$ and the image pixel rows $SR_1$-$SR_{M2}$, the corresponding reference pixel row in the corresponding reference pixel array is turned on but all the other reference pixel rows are turned off, and the average reference voltage signal selection unit 704 selects either the average reference voltage signal $AV_{REF1}$ or $AV_{REF2}$, it is feasible.

Figure 6:
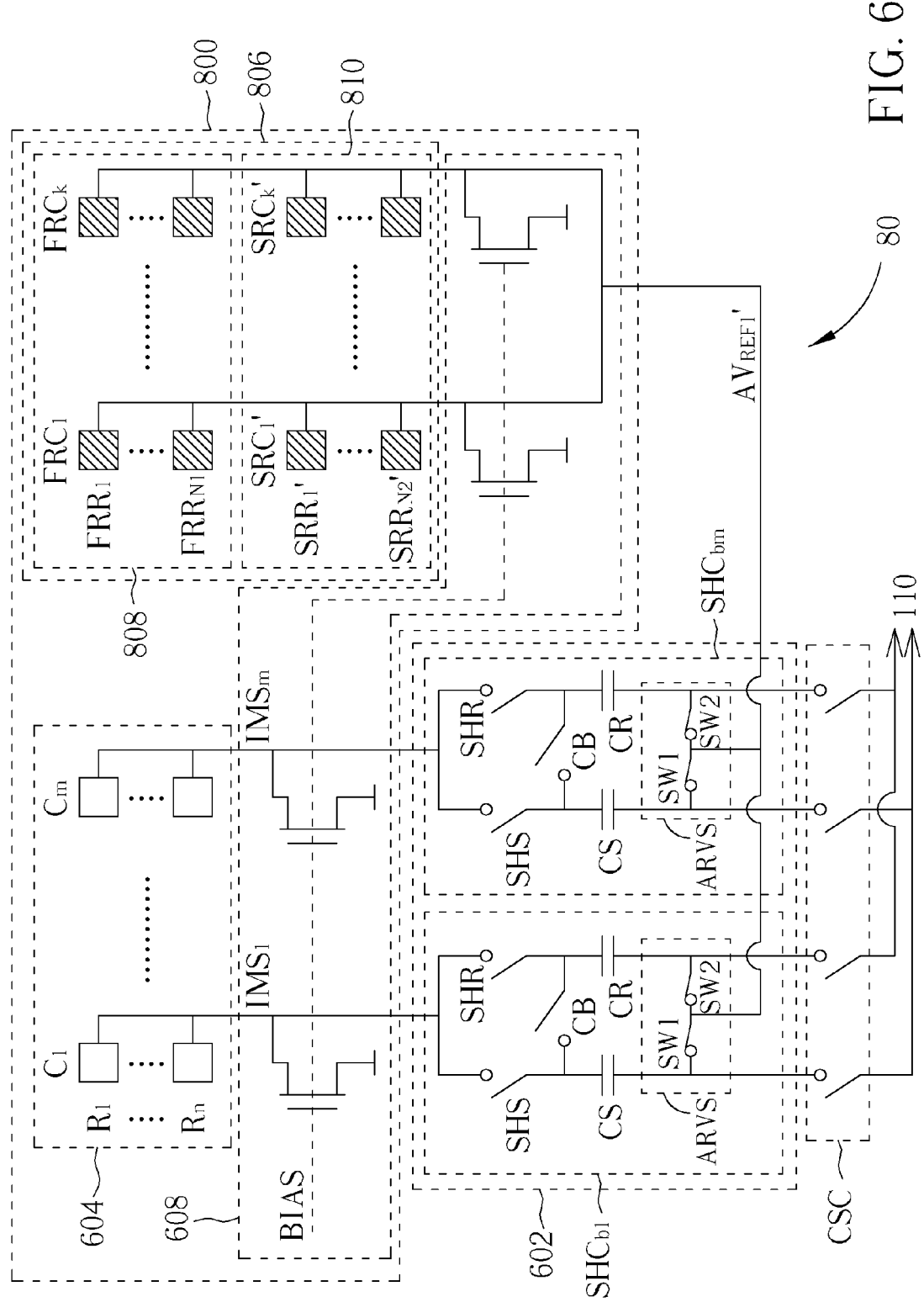
FIG. 6 is a schematic diagram partially illustrating a circuit of another image sensor according to an embodiment of the present invention.

On the other hand, please refer to FIG. 6; FIG. 6 is a schematic diagram partially illustrating a circuit of another image sensor 80 according to an embodiment. Since the image sensor 80 is partially similar to the image sensor 60, the same numerals and symbols denote components and signals of similar functions in FIG. 6 and the following description, and similar parts are not detailed redundantly. Unlike the image sensor 60, in a pixel unit 800 of the image sensor 80, the image pixel array 604 further includes a plurality of image pixel rows $SR_1$-$SR_{M2}$. In addition, a reference pixel array 806 of the pixel unit 800 comprises not only the reference pixel rows $FRR_1$-$FRR_{N1}$ and the reference pixel columns $FRC_1$-$FRC_k$ within a region 808 but also a plurality of reference pixels arranged in the reference pixel rows $SRR_1'$-$SRR_{N2}'$ and the reference pixel columns $SRC_1'$-$SRC_k'$ within a region 810. The reference pixel columns $SRC_1'$-$SRC_k'$ are coupled to the reference pixel columns $FRC_1$-$FRC_k$ and provides the plurality of the first reference voltage signal together with the reference pixels within the region 808.

Similar to the embodiment shown in FIG. 4, a total number M1 of a plurality of image pixel rows $FR_1$-$FR_{M1}$ within the region 808 of the image pixel array 604 is greater than a total number N1 of the reference pixel rows $FRR_1$-$FRR_{N1}$ in the reference pixel array 806. Also, a total number M2 of a plurality of image pixel rows $SR_1$-$SR_{M2}$ of the image pixel array 604 is greater than a total number N2 of the reference pixel rows $SRR_1'$-$SRR_{N2}'$ within the region 810 of the reference pixel array 806. More specifically, the image pixel rows $R_1$-$R_n$ are composed of the image pixel rows $FR_1$-$FR_{M1}$ and the image pixel rows $SR_1$-$SR_{M2}$; the reference pixel array 806 is composed of the reference pixel rows $FRR_1$-$FRR_{N1}$ and $SRR_1'$-$SRR_{N2}'$. If the total number of the image pixel rows $FR_1$-$FR_{M1}$ is M1, the total number of the image pixel rows $SR_1$-$SR_{M2}$ is M2, the total number of the reference pixel rows $FRR_1$-$FRR_{N1}$ is N1, and the total number of the reference pixel rows $SRR_1$-$SRR_{N2}$ is N2, then M1>N1 and M2>N2. Please note that in this embodiment, M1 is greater than N1 and M2 is greater than N2; nevertheless, in other embodiments, chances are that M1 is greater than N1 and alternatively M2 is greater than N2, which is still within the scope of the present invention.

In this structure, when the pixel readout circuit 602 reads the image pixel rows $FR_1$-$FR_{M1}$, the corresponding reference pixel rows within the region 808 are turned on but the corresponding reference pixel rows within the region 810 are turned off; when the pixel readout circuit 602 reads the image pixel rows $SR_1$-$SR_{M2}$, the corresponding reference pixel rows within the region 808 are turned off but the corresponding reference pixel rows within the region 810 are turned on. Accordingly, a corresponding average reference voltage signal $AV_{REF1}'$ is outputted. Preferably, the total number N2 of the reference pixel rows $SRR_1$-$SRR_{N2}$ may be designed to 1—that is, N2=1—so as to reduce the reference pixel area. As a result, in the image sensor 70, the image pixel rows $FR_1$-$FR_{M1}$ and the image pixel rows $SR_1$-$SR_{M2}$ may respectively share the reference pixel array 606 within the region 808 and the reference pixel array 710 within the region 810 so as to eliminate row noises.

Besides, the above-mentioned reference pixel rows $FRR_1$-$FRR_{N1}$, $SRR_1$-$SRR_{N2}$, $SRR_1'$-$SRR_{N2}'$ and 710 may be disposed before a first/foremost row or after a last/rearmost row of the image pixel rows $R_1$-$R_n$ and may be in parallel with the image pixel rows $R_1$-$R_n$—in other words, the reference pixel rows $FRR_1$-$FRR_{N1}$, $SRR_1$-$SRR_{N2}$, $SRR_1'$-$SRR_{N2}'$ and 710 are disposed in either the left side or the right side of the image pixel array 604. Alternatively, the reference pixel rows $FRR_1$-$FRR_{N1}$, $SRR_1$-$SRR_{N2}$, $SRR_1'$-$SRR_{N2}'$ and 710 may be disposed in perpendicular to the image pixel columns $C_1$-$C_m$—namely, the reference pixel rows $FRR_1$-$FRR_{N1}$, $SRR_1$-$SRR_{N2}$, $SRR_1'$-$SRR_{N2}'$ and 710 are disposed either above or beneath the image pixel array 604. In addition, preferably, the number of the reference pixels in each of the reference pixel rows $FRR_1$-$FRR_{N1}$, $SRR_1$-$SRR_{N2}$, $SRR_1'$-$SRR_{N2}$ is less than or equal to the number of image pixels in each of the image pixel rows $R_1$-$R_n$. Since the average reference voltage signals $AV_{REF1}$, $AV_{REF2}$, $AV_{REF1}'$ from the reference pixel arrays 606, 710, 806 are provided by each of the reference pixel rows, if the number of the reference pixels in each of the reference pixel rows is close to the number of the image pixels in each of the image pixel rows, amplifiers can be omitted, thereby avoiding extra noises and reducing circuit area when eliminating row noises by an analog approach.

On the other hand, please turn to FIG. 4. When the pixel readout circuit 602 reads any of the image pixel rows $R_1$-$R_n$, the pixel readout circuit 602 utilizes the average reference voltage signal $AV_{REF1}$ as a reference voltage to sample and hold the column sensing signals $IMS_1$-$IMS_m$ so as to generate a plurality of reset values and a plurality of sampling values. The pixel readout circuit 602 comprises the sample-and-hold circuits $SHC_{a1}$-$SHC_{am}$ respectively corresponding to the column sensing signals $IMS_1$-$IMS_m$. Each of the sample-and-hold circuits $SHC_{a1}$-$SHC_{am}$ respectively samples and holds the column sensing signals $IMS_1$-$IMS_m$ so as to generate one of the plurality of reset values and one of the plurality of sampling values.

Figure 2C:
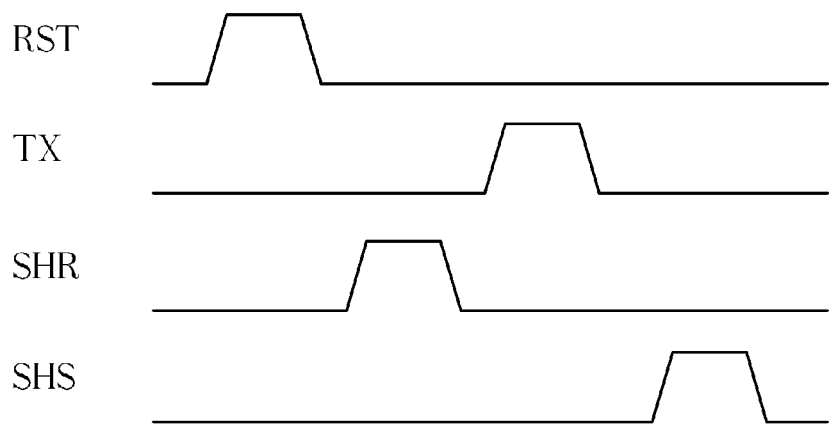
FIG. 2C is a timing schematic diagram illustrating the signals shown in FIGS. 2A and 2B.

FIG. 4 also presents a fine structure of the sample-and-hold circuits $SHC_{a1}$-$SHC_{am}$ according to a specific embodiment. Specifically, each of the sample-and-hold circuits $SHC_{a1}$-$SHC_{am}$ comprises a sampling switch SHS, a sampling capacitor CS, a reset switch SHR, a reset capacitor CR, a switch CB and an average reference voltage signal switch set ARVS with the structure shown in FIG. 4. That is, the sampling switch SHS has a first terminal coupled to a corresponding signal among the column sensing signals $IMS_1$-$IMS_m$ and a second terminal. The sampling capacitor CS has a first terminal coupled to the second terminal of the sampling switch SHS and a second terminal. The reset switch SHR has a first terminal coupled to a corresponding signal among the column sensing signals $IMS_1$-$IMS_m$ and a second terminal. The reset capacitor CR has a first terminal coupled to the second terminal of the reset switch SHR and a second terminal. The switch CB is coupled to the first terminal of the sampling capacitor CS and the first terminal of the reset capacitor CR. The average reference voltage signal switch set ARVS includes a switch SW1, which is coupled between the average reference voltage signal $AV_{REF1}$ and the second terminal of the sampling capacitor CS, and a switch SW2, which is coupled between the average reference voltage signal $AV_{REF1}$ and the second terminal of the reset capacitor CR. The second terminal of the sampling capacitor CS and the second terminal of the reset capacitor CR respectively provide one of the plurality of sampling values and one of the plurality of reset values. Each of the sample-and-hold circuits $SHC_{a1}$-$SHC_{am}$ can be easily understood according to FIGS. 2A to 2C and all the related descriptions, and will not be redundantly illustrated herein.

Figure 7:
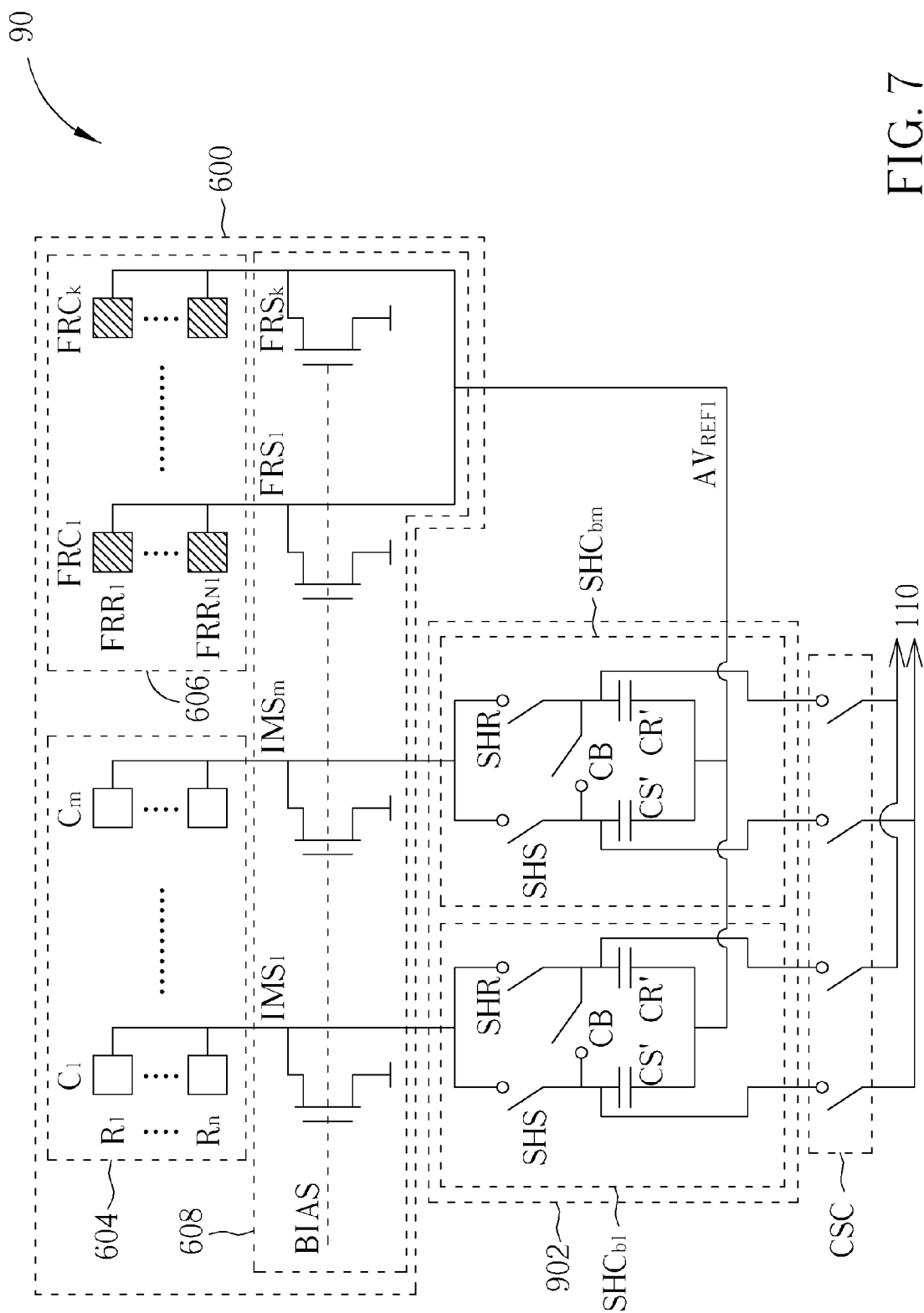
FIG. 7 is a schematic diagram partially illustrating a circuit of another image sensor according to an embodiment of the present invention

On the other hand, please refer to FIG. 7; FIG. 7 is a schematic diagram partially illustrating a circuit of another image sensor 90 according to an embodiment and also presents a fine structure of sample-and-hold circuits according to another specific embodiment. Since the image sensor 90 is partially similar to the aforementioned image sensor 60, the same numerals and symbols denote components and signals of similar functions in FIG. 7 and the following description, and similar parts are not detailed redundantly. Unlike the image sensor 60, the fine structure of the sample-and-hold circuits $SHC_{b1}$-$SHC_{bm}$ comprised by a pixel readout circuit 902 of the image sensor 90 is different from the fine structure of the sample-and-hold circuits $SHC_{a1}$-$SHC_{am}$ comprised by the pixel readout circuit 602.

To be more specifically, each of the sample-and-hold circuits $SHC_{b1}$-$SHC_{bm}$ comprises the sampling switch SHS, a sampling capacitor CS', the reset switch SHR and a reset capacitor CR' with the structure shown in FIG. 7. That is, the sampling switch SHS has a first terminal coupled to a corresponding signal among the column sensing signals $IMS_1$-$IMS_m$ and a second terminal. The sampling capacitor CS' has a first terminal coupled to the second terminal of the sampling switch SHS and a second terminal coupled to the average reference voltage signal $AV_{REF1}$. The reset switch SHR has a first terminal coupled to a corresponding signal among the column sensing signals $IMS_1$-$IMS_m$ and a second terminal. The reset capacitor CR' has a first terminal coupled to the second terminal of the reset switch SHR and a second terminal coupled to the average reference voltage signal $AV_{REF1}$. The first terminal of the sampling capacitor CS' and the first terminal of the reset capacitor CR' respectively provide one of the plurality of sampling values and one of the plurality of reset values. In this structure, the average reference voltage signal $AV_{REF1}$ is directly provided from the second terminal of the sampling capacitor CS' and the reset capacitor CR' without being selected by the average reference voltage signal switch set ARVS; therefore, the difference between the sampling values and the reset values can be directly provided from the first terminal of the sampling capacitor CS' and the reset capacitor CR'.

Figure 8:
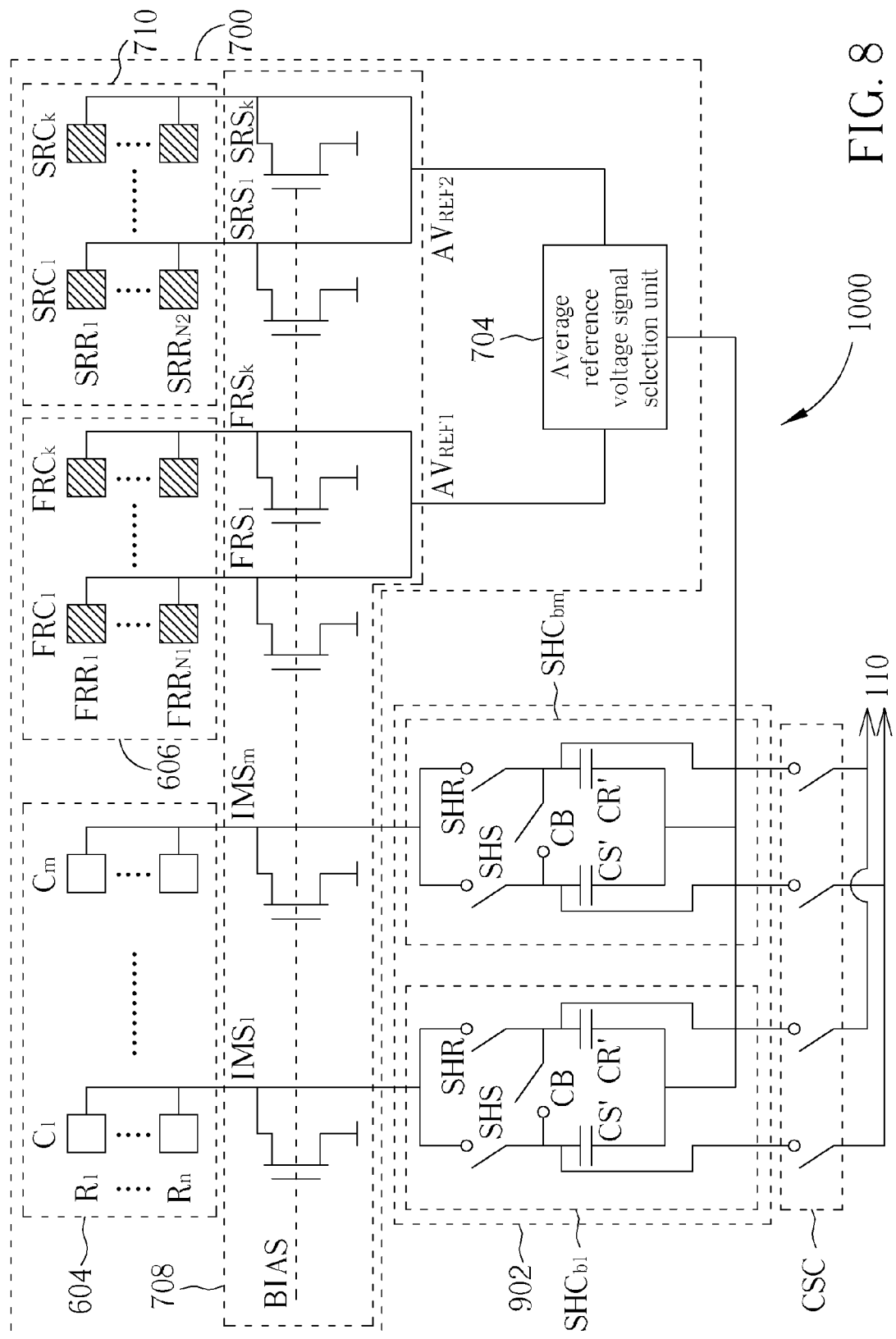
FIG. 8 is a schematic diagram partially illustrating a circuit of another image sensor according to an embodiment of the present invention.

Moreover, please refer to FIG. 8; FIG. 8 is a schematic diagram partially illustrating a circuit of another image sensor 1000 according to an embodiment. Since the image sensor 1000 is partially similar to the aforementioned the image sensors 70 and 90, the same numerals and symbols denote components and signals of similar functions in FIG. 8 and the following description, and similar parts are not detailed redundantly. Unlike the image sensors 70 and 90, the image sensor 1000 provides either the average reference voltage signal $AV_{REF1}$ or the average reference voltage signal $AV_{REF2}$ to the structure of the sample-and-hold circuits $SHC_{b1}$-$SHC_{bm}$ in the pixel readout circuit 902 by the structure of the pixel unit 700 so as to generate a plurality of reset values and a plurality of sampling values. The operation of the sample-and-hold circuits $SHC_{b1}$-$SHC_{bm}$ in the pixel unit 700 and the pixel readout circuit 902 can be easily understood according to all the descriptions mentioned above, and will not be redundantly illustrated herein.

Figure 9:
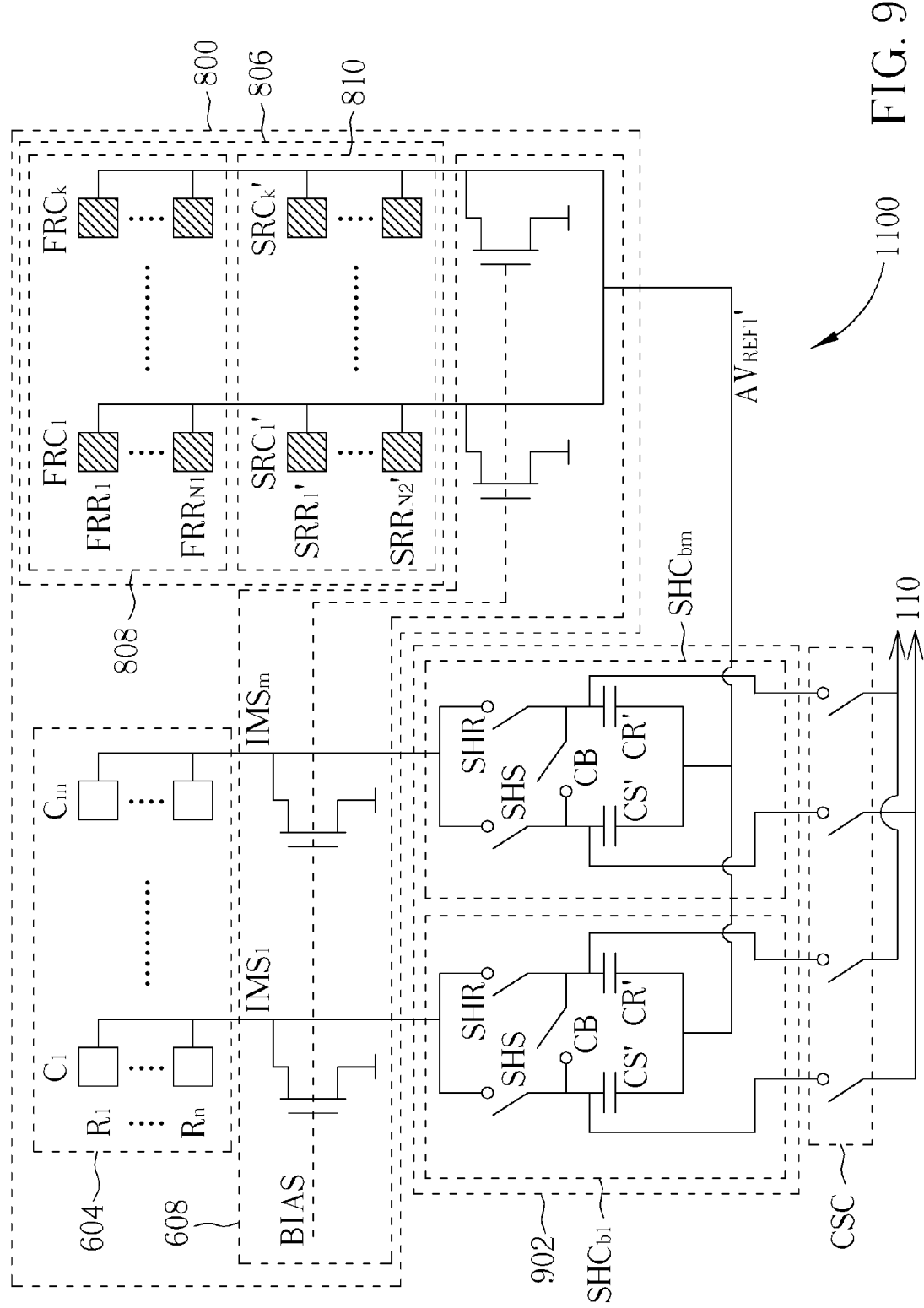
FIG. 9 is a schematic diagram partially illustrating a circuit of another image sensor according to an embodiment of the present invention.

On the other hand, please refer to FIG. 9; FIG. 9 is a schematic diagram partially illustrating a circuit of another image sensor 1100 according to an embodiment. Since the image sensor 1100 is partially similar to the aforementioned image sensors 80 and 90, the same numerals and symbols denote components and signals of similar functions in FIG. 9 and the following description, and similar parts are not detailed redundantly. Unlike the image sensors 80 and 90, the image sensor 1100 provides the average reference voltage signal $AV_{REF1}'$ to the structure of the sample-and-hold circuits $SHC_{b1}$-$SHC_{bm}$ in the pixel readout circuit 902 by the structure of the pixel unit 806 so as to generate a plurality of reset values and a plurality of sampling values. The operation of the sample-and-hold circuits $SHC_{b1}$-$SHC_{bm}$ in the reference pixel array 806 and the pixel readout circuit 902 can be easily understood according to all the descriptions mentioned above, and will not be redundantly illustrated herein.

Figure 10:
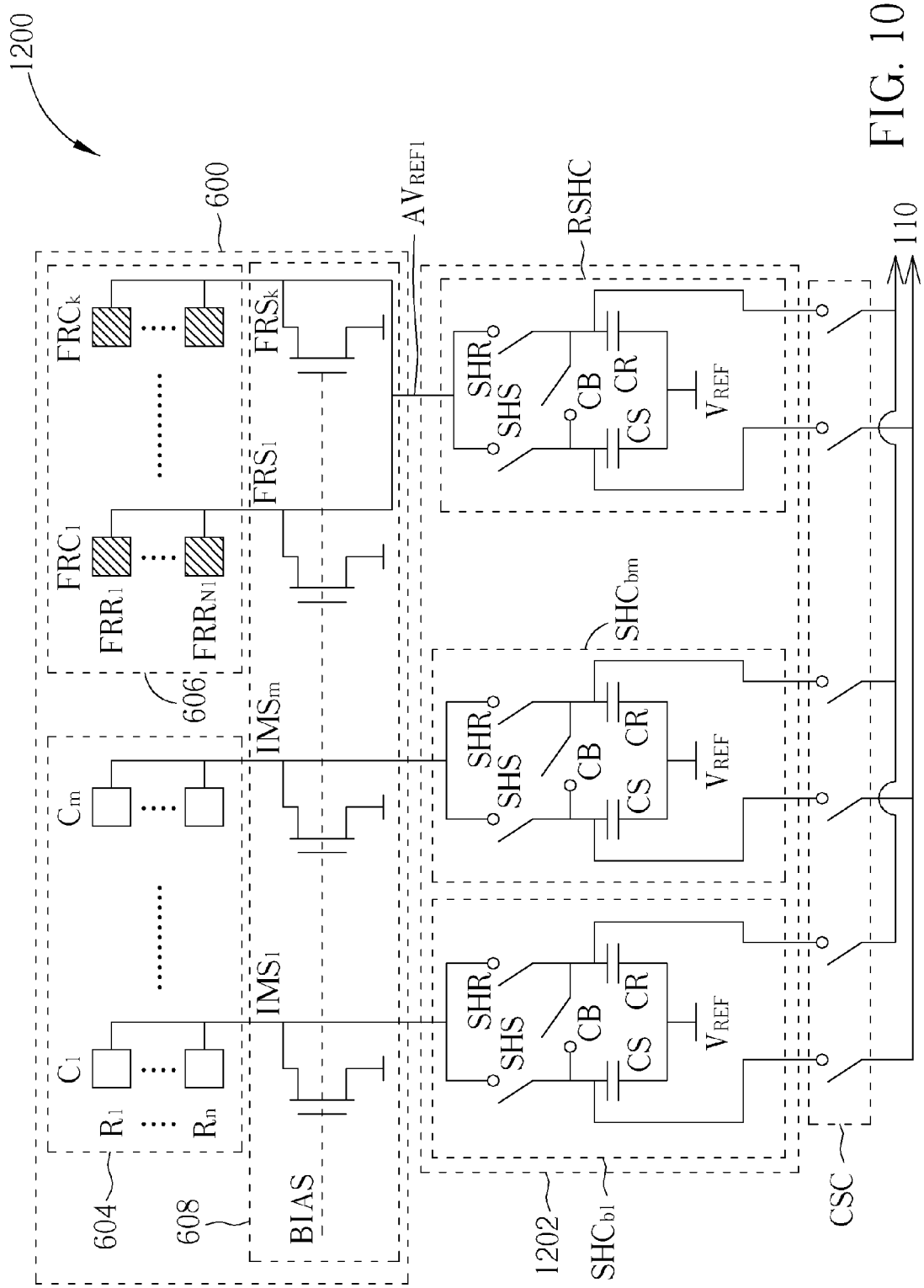
FIG. 10 is a schematic diagram partially illustrating a circuit of another image sensor according to an embodiment of the present invention.

In addition, please refer to FIG. 10; FIG. 10 is a schematic diagram partially illustrating a circuit of another image sensor 1200 according to an embodiment. Since the image sensor 1200 is partially similar to the aforementioned image sensor 90, the same numerals and symbols denote components and signals of similar functions in FIG. 10 and the following description, and similar parts are not detailed redundantly. Unlike the image sensor 90, the pixel readout circuit 1202 comprises not only the sample-and-hold circuits $SHC_{a1}$-$SHC_{am}$ respectively corresponding to the column sensing signals $IMS_1$-$IMS_m$ but also a sample-and-hold circuit RSHC corresponding to the average reference voltage signal $AV_{REF1}$. Each of the sample-and-hold circuits $SHC_{a1}$-$SHC_{am}$ and RSHC respectively samples and holds the column sensing signals $IMS_1$-$IMS_m$ and the average reference voltage signal $AV_{REF1}$ so as to generate one of the plurality of reset values and one of the plurality of sampling values, or, at least one of the reference reset values and at least one of the reference sampling values. Additionally, the second terminal of the sampling capacitor CS' and the reset capacitor CR' in the sample-and-hold circuits $SHC_{b1}$-$SHC_{bm}$ and RSHC is coupled to the external reference voltage $V_{REF}$, which is not provided by the reference pixel array 606. It is worth noting that the image sensors 1000 and 1100 may be modified or altered according to how the image sensor 90 is changed to the image sensor 1200.

To be more specifically, each of the sample-and-hold circuits $SHC_{b1}$-$SHC_{bm}$ and RSHC comprises the sampling switch SHS, a sampling capacitor CS', the reset switch SHR and a reset capacitor CR' with the structure shown in FIG. 10. The sampling switch SHS has a first terminal, which is coupled to a corresponding signal among the column sensing signals $IMS_1$-$IMS_m$ and the average reference voltage signal $AV_{REF1}$, and a second terminal; in other words, the sampling switches SHS of the sample-and-hold circuits $SHC_{b1}$-$SHC_{bm}$ and RSHC respectively correspond to the column sensing signals $IMS_1$-$IMS_m$ and the average reference voltage signal $AV_{REF1}$. The sampling capacitor CS' has a first terminal coupled to the second terminal of the sampling switch SHS and a second terminal coupled to the reference voltage $V_{REF}$. The reset switch SHR has a first terminal, which is coupled to a corresponding signal among the column sensing signals $IMS_1$-$IMS_m$ and the average reference voltage signal $AV_{REF1}$, and a second terminal; in other words, the sampling switches SHS of the sample-and-hold circuits $SHC_{b1}$-$SHC_{bm}$ and RSHC respectively correspond to the column sensing signals $IMS_1$-$IMS_m$ and the average reference voltage signal $AV_{REF1}$. The reset capacitor CR' has a first terminal coupled to the second terminal of the reset switch SHR and a second terminal coupled to the reference voltage $V_{REF}$. The first terminal of the sampling capacitor CS' and the first terminal of the reset capacitor CR' respectively provide one of the plurality of sampling values and one of the plurality of reset values, or, at least one of the reference reset values and at least one of the reference sampling values. In this structure, the external reference voltage $V_{REF}$ is directly provided from the second terminal of the sampling capacitor CS' and the reset capacitor CR' without being selected by the average reference voltage signal switch set ARVS; therefore, the difference between the sampling values and the reset values, or, the difference between the reference reset values and the reference sampling values can be directly provided by the first terminal of the sampling capacitor CS' and the reset capacitor CR'.

In this structure, apart from outputting the differences between the sampling values and the reset values, which are obtained by the column sensing signals $IMS_1$-$IMS_m$, to the following circuits, the image sensor 1200 may merely send the difference between the reference reset values and the reference sampling values from the average reference voltage signal $AV_{REF1}$ to the following circuits so as to eliminate row noises according to the difference between the reference reset values and the reference sampling values from the average reference voltage signal $AV_{REF1}$ by a digital approach. Therefore, compared to the image sensor 30 as shown in FIG. 3, where all of the differences between the reference reset values and the reference sampling values of the reference pixel columns $C_{m+1}$-$C_{m+k}$ must be transmitted to the following circuits, this embodiment can prevent from the drop of frame rate.

Besides, the image sensors 60-90 and 1000-1200 mentioned above may further comprise the column selection circuit CSC coupled to the pixel readout circuits 602, 902, 1202 so as to select and also output one of the plurality of reset values and one of the plurality of sampling values. The image sensors 60-90 and 1000-1200 may further comprise the differential amplifier 110, the analog-to-digital converter 112 (ADC) as shown in FIG. 1 and the image signal processor 114 (not shown in FIGS. 4-10).

In the structures of the image sensors 60-90, 1000 and 1100 which eliminate row noises by the analog approach, the differential amplifier 110 generates a plurality of corresponding analog pixel values according to the differences between the plurality of reset values and the plurality of sampling values without the row noises, meaning that the row noises coupled to the other terminals of the sampling capacitor CS, CS' and the reset capacitor CR, CR' are eliminated. The analog-to-digital converter 112 is utilized to convert the plurality of analog pixel values into a plurality of digital pixel values. The image signal processor 114 is employed to display the plurality of digital pixel values.

On the other hand, in the structure of the image sensor 1200 which eliminate row noises by the digital approach, apart from generating a plurality of corresponding analog pixel values according to the difference between the plurality of reset values and the plurality of sampling values where the row noises remains, the differential amplifier 110 also generates an analog row noise value according to the difference between the at least one the reference reset value and the at least one the reference sampling value. The analog-to-digital converter 112 then converts a plurality of analog pixel values and the analog row noise values into a plurality of digital pixel values and a digital row noise values. The image signal processor 114 may display after the digital row noise values are subtracted from the plurality of digital pixel values—namely, eliminating row noises by the digital approach.

It is worth noting that in some embodiments the image pixel rows share one or more of the identical reference pixel rows with each other, and it means that when the pixel readout circuit reads any image pixel row in the image pixel rows, only one or more or even all of the reference pixel rows which are identical can be referenced and hence be turned on. However, the present invention is not limited thereto, and in some other embodiments, each of the image pixel rows or at least two of the image pixel rows can reference one or more of the reference pixel rows of different amount or/and position as long as there are one or more of the identical reference pixel rows in the image pixel row to be referenced. Takes the readout process of two rows of the image pixel rows as an example in the following illustration, while the readout process of more rows are also applied. When the pixel readout circuit reads certain image pixel row in the image pixel rows, one or more of the reference pixel rows, which are referred to as a first group reference pixel row, are referenced and hence are turned on. When the pixel readout circuit reads another image pixel row in the image pixel rows, one or more of the reference pixel rows, which are referred to as a second group reference pixel row, are referenced and hence are turned on. The first group reference pixel row and the second group reference pixel row are not required to be identical but may be almost the same; namely, the first group reference pixel row and the second group reference pixel row includes one or more of the reference pixel rows identical to each other.

In the prior art, a great deal of the reference pixel columns must be disposed behind the image pixel columns and consequently a large number of area are necessary for the reference pixels to eliminate row noises. Moreover, the frame rate is reduced if the row noises are suppressed by a digital approach; extra noises come when the row noises are suppressed by an analog approach. In contrast, in the aforementioned embodiments, one or more of the reference pixel rows are shared to eliminate row noises from different image pixel rows and to reduce the reference pixel area, thereby preventing from the drop of the frame rate if eliminating row noises by the digital approach and avoiding extra noises and reducing the circuit area when eliminating row noises by the analog approach.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor, comprising:
   a pixel unit, comprising:
      an image pixel array, comprising a plurality of image pixels, arranged in a plurality of image pixel rows and a plurality of image pixel columns;
      a first reference pixel array, comprising a plurality of first reference pixels, arranged in one or more first reference pixel rows and a plurality of first reference pixel columns; and
      a bias circuit, coupled to the image pixel array, the first reference pixel array, and a pixel readout circuit, wherein the bias circuit generates a plurality of column sensing signals in a plurality of nodes coupled to the plurality of image pixel columns according to a bias voltage, generates a plurality of first reference signals in the plurality of nodes coupled to the plurality of first reference pixel columns according to the bias voltage, and converts the plurality of first reference signals to a first average reference voltage signal; and the pixel readout circuit, coupled to the bias circuit of the pixel unit for generating a plurality of reset values and a plurality of sampling values according to the plurality of column sensing signals and the first average reference voltage signal;

wherein the plurality of image pixel rows comprises a plurality of first image pixel rows, a total number of the plurality of first image pixel rows is M1, and a total number of the first reference pixel rows is N1, where M1>N1.

2. The image sensor of claim 1, wherein the plurality of first reference pixels are disposed in an optical black area or are non-light-sensing pixels.

3. The image sensor of claim 1, wherein N1=1.

4. The image sensor of claim 1, wherein when the pixel readout circuit reads each image pixel row of the plurality of first image pixel rows, each row of the one or more first reference pixel rows is turned on.

5. The image sensor of claim 1, wherein
when the pixel readout circuit reads one of the plurality of first image pixel rows, a first set of reference pixel rows among the one or more of first reference pixel rows are turned on; and when the pixel readout circuit reads another one of the plurality of first image pixel rows, a second set of reference pixel rows among the one or more of first reference pixel rows are turned on, wherein the first set of reference pixel rows and the second set of reference pixel rows comprise one or more of identical reference pixel rows.

6. The image sensor of claim 1, wherein the pixel unit further comprises:

a second reference pixel array, comprising a plurality of second reference pixels arranged in one or more of second reference pixel rows and a plurality of second reference pixel columns;

wherein the bias circuit is further coupled to the second reference pixel array, and the bias circuit generates a plurality of second reference signals in a plurality of nodes coupled to the plurality of second reference pixel columns according to the bias voltage, and converts a plurality of second reference signals to a second average reference voltage signal;

the pixel readout circuit is further coupled to the second reference pixel array, and the pixel readout circuit generates the plurality of reset values and the plurality of sampling values according to the plurality of column sensing signals and the first average reference voltage signal and the second average reference voltage signal; and the plurality of image pixel rows further comprises a plurality of second image pixel rows, wherein a total number of the plurality of second image pixel rows is M2, and a total number of the plurality of second reference pixel rows is N2, where M2>N2.

7. The image sensor of claim 6, wherein the pixel unit further comprises an average reference voltage signal selection unit, coupled between the first reference pixel array and the second reference pixel array, for selecting the first reference voltage signal to the pixel readout circuit when the pixel readout circuit reads one of the first image pixel rows, and selecting the second reference voltage signal to the pixel readout circuit when the pixel readout circuit reads one of the second image pixel rows.

8. The image sensor of claim 6, wherein N2=1.

9. The image sensor of claim 1, wherein
the first reference pixel array further comprises a plurality of second reference pixels, arranged in one or more of second reference pixel rows and a plurality of second reference pixel columns, wherein the plurality of second reference pixel columns are coupled to the plurality of first reference pixel columns, and the plurality of second reference pixel columns and the plurality of first reference pixels rows jointly provide the first reference voltage signal; and the plurality of image pixel rows further comprises a plurality of second image pixel rows, wherein a total number of the plurality of second image pixel rows is M2, and a total number of the plurality of second reference pixel rows is N2, where M2>N2.

10. The image sensor of claim 9, wherein
the plurality of first reference pixels are turned on and the plurality of second reference pixels are turned off when the pixel readout circuit reads the plurality of first reference pixels; and the plurality of first reference pixels are turned off and the plurality of second reference pixels are turned on when the pixel readout circuit reads the plurality of second reference pixels.

11. The image sensor of claim 9, wherein N2=1.

12. The image sensor of claim 1, wherein the one or more of reference pixel rows are disposed before a first row or after a last row of the plurality of image pixel rows, and are in parallel with the plurality of image pixel rows.

13. The image sensor of claim 1, wherein the one or more of reference pixel rows are disposed in perpendicular to the plurality of image pixel columns.

14. The image sensor of claim 1, wherein a number of reference pixels in each of the one or more of first reference pixel rows is less or equal to a number of image pixels in each of the plurality of image pixel rows.

15. The image sensor of claim 1, wherein when the pixel readout circuit reads any of the plurality of image pixel rows, the pixel readout circuit utilizes the first average reference voltage signal as a reference voltage to sample and hold a plurality of sensing signals, to generate the plurality of reset values and the plurality of sampling values.

16. The image sensor of claim 1, wherein the pixel readout circuit comprises a plurality of sample-and-hold circuits corresponding to the plurality of column sensing signals, and each of the plurality of sample-and-hold circuit sample and hold each of the plurality of column sensing signals, respectively, to generate one of the plurality of reset values and one of the plurality of sampling values.

17. The image sensor of claim 16, wherein each of the sample-and-hold circuits comprises:

a sampling switch, having a first terminal coupled to a corresponding signal among the plurality of column sensing signals, and having a second terminal;

a sampling capacitor, having a first terminal coupled to the second terminal of the sampling switch, and having a second terminal;

a reset switch, having a first terminal coupled to a corresponding signal among the plurality of column sensing signals, and having a second terminal;

a reset capacitor, having a first terminal coupled to the second terminal of the reset switch, and having a second terminal;

a switch, coupled to the first terminal of the sampling capacitor and the first terminal of the reset capacitor; and
an average reference voltage signal switch set, comprising a first switch coupled between the first average reference voltage signal and the second terminal of the sampling capacitor, and a second switch coupled between the first average reference voltage signal and the second terminal of the reset capacitor;
wherein the second terminal of the sampling capacitor and the second terminal of the reset capacitor provide one of the plurality of sampling values and one of the plurality of reset values, respectively.

18. The image sensor of claim 16, wherein each of the sample-and-hold circuits comprises:
a sampling switch, having a first terminal coupled to a corresponding signal among the plurality of column sensing signals, and having a second terminal;
a sampling capacitor, having a first terminal coupled to the second terminal of the sampling switch, and having a second terminal;
a reset switch, having a first terminal coupled to a corresponding signal among the plurality of column sensing signals, and having a second terminal;
a reset capacitor, having a first terminal coupled to the second terminal of the reset switch, and having a second terminal;
wherein the first terminal of the sampling capacitor and the first terminal of the reset capacitor provide one of the plurality of sampling values and one of the plurality of reset values, respectively.

19. The image sensor of claim 16 further comprises:
a differential amplifier, for generating a plurality of corresponding analog pixel values according to the difference between the plurality of reset values and the plurality of sampling values;
an analog-to-digital converter (ADC), for converting the plurality of analog pixel values into a plurality of digital pixel values; and
an image signal processor, for displaying the plurality of digital pixel values.

20. The image sensor of claim 1, wherein the pixel readout circuit comprises a plurality of sample-and-hold circuits corresponding to the plurality of column sensing signals and the first average reference signal, each sample-and-hold circuit samples and holds one of the plurality of column sensing signals and the first average reference signal, to generate one of the plurality of reset values and one of the plurality of sampling values, or one of at least one reference reset value and one of at least one reference sampling value.

21. The image sensor of claim 20, wherein each of the sample-and-hold circuits comprises:
a sampling switch, having a first terminal coupled to a corresponding signal among the plurality of column sensing signals and the first average reference voltage signal, and having a second terminal;
a sampling capacitor, having a first terminal coupled to the second terminal of the sampling switch, and having a second terminal;
a reset switch, having a first terminal coupled to a corresponding signal among the plurality of column sensing signals and the first average reference voltage signal, and having a second terminal coupled to a reference voltage; and
a reset capacitor, having a first terminal coupled to the second terminal of the reset switch, and having a second terminal coupled to the reference voltage;

wherein the first terminal of the sampling capacitor and the first terminal of the reset capacitor provide one of the plurality of sampling values and one of the plurality of reset values, or one of at least one reference reset value and at least one reference sampling value, respectively.

22. The image sensor of claim 20 further comprising:
a differential amplifier, for generating a plurality of corresponding analog pixel values according to the difference between the plurality of reset values and the plurality of sampling values, and generating an analog row noise value according to the difference between the at least one reference reset value and the at least one reference sampling value;
an analog-to-digital converter (ADC), for converting a plurality of analog pixel values and the analog row noise values into a plurality of digital pixel values and a digital row noise value; and
an image signal processor, for displaying by subtracting the digital row noise values from the plurality of digital pixel values.

23. The image sensor of claim 1 further comprising a column selection circuit, coupled to the pixel readout circuit for selecting one of the plurality of reset values and selecting one of the plurality of sampling values.

24. An image sensor, comprising:
a pixel unit, comprising:
an image pixel array, comprising a plurality of image pixels, arranged in a plurality of image pixel rows and a plurality of image pixel columns;
a first reference pixel array, comprising a plurality of first reference pixels, arranged in one or more of first reference pixel rows and a plurality of first reference pixel columns; and
a bias circuit, coupled to the image pixel array, the first reference pixel array, and a pixel readout circuit, wherein the bias circuit generates a plurality of column sensing signals in a plurality of nodes coupled to a plurality of image pixel columns according to a bias voltage, generates a plurality of first reference signals in a plurality of nodes coupled to a plurality of first reference pixel columns, and converts the plurality of first reference signals to a first average reference voltage signal; and
the pixel readout circuit, coupled to the bias circuit of the pixel unit for generating a plurality of reset values and a plurality of sampling values according to the plurality of column sensing signals and the first average reference voltage signal;
wherein when the pixel readout circuit reads an image pixel row among the plurality of first image pixel rows, a first image pixel row among the one or more of first reference pixel rows is turned on; and
when the pixel readout circuit reads another image pixel row among the plurality of first image pixel rows, a second image pixel row among the one or more of first reference pixel rows is turned on, wherein the first reference pixel row and the second reference pixel row comprise one or more of identical reference pixel rows.

25. The image sensor of claim 24, wherein when the pixel readout circuit reads each image pixel row of the plurality of first image pixel rows, each row of the one or more of first reference pixel rows is turned on.

26. The image sensor of claim 24, wherein the total row number of the one or more of first reference pixel rows is 1.

* * * * *